United States Patent
Sharma et al.

(10) Patent No.: US 12,459,358 B2
(45) Date of Patent: Nov. 4, 2025

(54) GRAPHICS PROJECTOR FOR USE IN A VEHICLE

(71) Applicant: GM Global Technology Operations LLC, Detroit, MI (US)

(72) Inventors: Manoj Sharma, Troy, MI (US); Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/186,343

(22) Filed: Mar. 20, 2023

(65) Prior Publication Data

US 2024/0317054 A1 Sep. 26, 2024

(51) Int. Cl.
*B60K 35/23* (2024.01)
*B60K 35/60* (2024.01)

(52) U.S. Cl.
CPC ............. *B60K 35/23* (2024.01); *B60K 35/60* (2024.01); *B60K 2360/332* (2024.01); *B60K 2360/334* (2024.01); *B60K 2360/785* (2024.01)

(58) Field of Classification Search
None
See application file for complete search history.

(56) References Cited

U.S. PATENT DOCUMENTS

| | | | |
|---|---|---|---|
| 6,396,217 | B1 | 5/2002 | Weindorf |
| 6,639,733 | B2 | 10/2003 | Minano et al. |
| 7,286,296 | B2 | 10/2007 | Chaves et al. |
| 12,024,016 | B1 * | 7/2024 | Sharma ............ B60K 35/00 |
| 2005/0086032 | A1 | 4/2005 | Benitez et al. |

(Continued)

FOREIGN PATENT DOCUMENTS

| CN | 101788751 A | * | 3/2013 |
|---|---|---|---|
| DE | 102017004859 A1 | | 3/2019 |

OTHER PUBLICATIONS

Dross, et al. "Non-imaging optics combine LEDs into one bright source," SPIE, Jun. 27, 2006, https://spie.org/news/0197-non-imaging-optics-combine-leds-into-one-bright-source?SSO=1.

(Continued)

*Primary Examiner* — Ryan Crockett
(74) *Attorney, Agent, or Firm* — Vivacqua Crane, PLLC (57) ABSTRACT

A graphics projector for use in a vehicle includes a light source module. The light source module may include an LED array configured to produce a source light. The light source module further includes an optical filter in optical communication with the led array. The optical filter is configured to receive the source light and transmit a filtered light. The light source module further includes a focusing lens in optical communication with the optical filter. The focusing lens is configured to receive the filtered light and transmit a narrow-beam light. The graphics projector also includes an optical collimator in optical communication with the light source module. The optical collimator is configured to receive the narrow-beam light and transmit a collimated light. The graphics projector also includes an optoelectrical mirror in optical communication with the optical collimator. The optoelectrical mirror is configured to direct the collimated light to form a graphic.

20 Claims, 3 Drawing Sheets

(56) References Cited

U.S. PATENT DOCUMENTS

| | | | |
|---|---|---|---|
| 2005/0243570 A1 | 11/2005 | Chaves et al. | |
| 2008/0291032 A1* | 11/2008 | Prokhorov | B60W 50/14 340/576 |
| 2010/0253918 A1 | 10/2010 | Seder et al. | |
| 2013/0082589 A1* | 4/2013 | So | H10K 59/351 313/504 |
| 2013/0170004 A1* | 7/2013 | Futterer | G02B 6/0046 359/9 |
| 2013/0271735 A1* | 10/2013 | Tanaka | G03B 21/208 353/38 |
| 2014/0133024 A1* | 5/2014 | Lippey | G02F 1/3532 359/464 |
| 2016/0029001 A1* | 1/2016 | Jannard | G02B 27/48 353/7 |
| 2017/0212633 A1 | 7/2017 | You et al. | |
| 2020/0254877 A1 | 8/2020 | Nakajima et al. | |
| 2021/0191132 A1 | 6/2021 | Karner et al. | |
| 2021/0341736 A1* | 11/2021 | Watanabe | G02B 27/4205 |
| 2021/0360211 A1 | 11/2021 | Kawamura | |
| 2023/0375829 A1* | 11/2023 | Seder | B60K 35/00 |
| 2024/0391316 A1* | 11/2024 | Sharma | B60K 35/23 |
| 2025/0004270 A1* | 1/2025 | Weiss | G02B 27/01 |

OTHER PUBLICATIONS

United States Patent and Trademark Office. U.S. Appl. No. 17/749,464, filed May 20, 2022.

* cited by examiner

GRAPHICS PROJECTOR FOR USE IN A VEHICLE

INTRODUCTION

The present disclosure relates to systems and methods for displaying graphics in a vehicle, and more particularly, to graphics projectors for use in a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a surface (e.g., a windscreen) of the vehicle. However, current graphics projectors may utilize high-intensity, concentrated light sources, such as, for example, lasers. High-intensity, concentrated light sources may cause the occupant discomfort when reflecting off of surfaces of the vehicle. Additionally, high-intensity, concentrated light sources may increase weight and resource use of the vehicle.

Thus, while current graphics projectors achieve their intended purpose, there is a need for a new and improved system for graphics projection for a vehicle.

SUMMARY

According to several aspects, a graphics projector for use in a vehicle is provided. The graphics projector includes a light source module. The light source module may include a light-emitting diode (LED) array configured to produce a source light. The light source module further may include an optical filter in optical communication with the led array. The optical filter is configured to receive the source light and transmit a filtered light. The light source module further may include a focusing lens in optical communication with the optical filter. The focusing lens is configured to receive the filtered light and transmit a narrow-beam light. The graphics projector also includes an optical collimator in optical communication with the light source module. The optical collimator is configured to receive the narrow-beam light and transmit a collimated light. The graphics projector also includes an optoelectrical mirror in optical communication with the optical collimator. The optoelectrical mirror is configured to direct the collimated light to form a graphic.

In another aspect of the present disclosure, the optical filter is an optical bandpass filter configured to filter the source light and transmit the filtered light. The filtered light includes only light having a wavelength within a passband of the optical bandpass filter.

In another aspect of the present disclosure, the graphics projector further includes a plurality of light source modules in optical communication with the optical collimator.

In another aspect of the present disclosure, the graphics projector further includes an optical waveguide in optical communication with the plurality of light source modules and the optical collimator. The optical waveguide is configured to transmit the narrow-beam light from each of the plurality of light source modules to the optical collimator.

In another aspect of the present disclosure, the optical waveguide is a fiber-optic cable in optical communication with the focusing lens of each of the plurality of light source modules using a fiber-optic coupler.

In another aspect of the present disclosure, the graphics projector further includes a plurality of dichroic mirrors. Each of the plurality of dichroic mirrors is in optical communication with one of the plurality of light source modules. Each of the plurality of dichroic mirrors is configured to transmit the narrow-beam light from one of the plurality of light source modules to the optical collimator.

In another aspect of the present disclosure, each of the plurality of dichroic mirrors is configured to reflect a predetermined wavelength of the narrow-beam light and transmit all other wavelengths of the narrow-beam light.

In another aspect of the present disclosure, one of the plurality of light source modules is configured to produce narrow-beam light having a wavelength of 380 nanometers. One of the plurality of light source modules is configured to produce narrow-beam light having a wavelength of 405 nanometers. One of the plurality of light source modules is configured to produce narrow-beam light having a wavelength of 460 nanometers.

In another aspect of the present disclosure, the optoelectrical mirror is a digital micromirror device (DMD).

In another aspect of the present disclosure, the optoelectrical mirror is at least one of a microelectromechanical scanning mirror and a galvanometer mirror.

According to several aspects, a projector light source is provided. The projector light source includes a light source module. The light source module may include a light-emitting diode (LED) array configured to produce a source light. The light source module further may include an optical filter in optical communication with the led array. The optical filter is configured to receive the source light and transmit a filtered light. The light source module further may include a focusing lens in optical communication with the optical filter. The focusing lens is configured to receive the filtered light and transmit a narrow-beam light. The projector light source also includes an optical collimator in optical communication with the light source module. The optical collimator is configured to receive the narrow-beam light and transmit a collimated light.

In another aspect of the present disclosure, the optical filter is an optical bandpass filter configured to filter the source light and transmit the filtered light. The filtered light includes only light having a wavelength within a passband of the optical bandpass filter.

In another aspect of the present disclosure, the projector light source further includes a plurality of light source modules in optical communication with the optical collimator.

In another aspect of the present disclosure, the projector light source further includes an optical waveguide in optical communication with the plurality of light source modules and the optical collimator. The optical waveguide is configured to transmit the narrow-beam light from each of the plurality of light source modules to the optical collimator.

In another aspect of the present disclosure, the optical waveguide is a fiber-optic cable in optical communication with the focusing lens of each of the plurality of light source modules using a fiber-optic coupler.

In another aspect of the present disclosure, the projector light source further includes a plurality of dichroic mirrors. Each of the plurality of dichroic mirrors is in optical communication with one of the plurality of light source modules. Each of the plurality of dichroic mirrors is configured to transmit the narrow-beam light from one of the plurality of light source modules to the optical collimator.

In another aspect of the present disclosure, one of the plurality of light source modules is configured to produce narrow-beam light having a wavelength of 380 nanometers. One of the plurality of light source modules is configured to produce narrow-beam light having a wavelength of 405 nanometers. One of the plurality of light source modules is configured to produce narrow-beam light having a wavelength of 460 nanometers.

According to several aspects, a graphics projector for use in a vehicle is provided. The graphics projector includes a plurality of light source modules. Each of the plurality of light source modules may include a light-emitting diode (LED) array configured to produce a source light. Each of the plurality of light source modules further may include an optical filter in optical communication with the led array. The optical filter is configured to receive the source light and transmit a filtered light. Each of the plurality of light source modules further may include a focusing lens in optical communication with the optical filter. The focusing lens is configured to receive the filtered light and transmit a narrow-beam light. The graphics projector also includes a fiber-optic coupler having a plurality of input ports and an output port. Each of the plurality of input ports of the fiber-optic coupler is in optical communication with one of the plurality of light source modules. The graphics projector also includes an optical collimator in optical communication with the output port of the fiber-optic coupler. The optical collimator is configured to receive the narrow-beam light from the plurality of light source modules and transmit a collimated light. The graphics projector also includes an optoelectrical mirror in optical communication with the optical collimator. The optoelectrical mirror is configured to direct the collimated light to form a graphic.

In another aspect of the present disclosure, one of the plurality of light source modules is configured to produce narrow-beam light having a wavelength of 380 nanometers. One of the plurality of light source modules is configured to produce narrow-beam light having a wavelength of 405 nanometers. One of the plurality of light source modules is configured to produce narrow-beam light having a wavelength of 460 nanometers.

In another aspect of the present disclosure, the optoelectrical mirror is at least one of a digital micromirror device (DMD), a microelectromechanical scanning mirror, and a galvanometer mirror.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

For the purpose of displaying graphics (e.g., for head-up display systems), vehicles may be equipped with graphics projectors. However, HUD systems may require graphics projectors with high power light sources, such as lasers. More specifically, for the purpose of exciting transparent phosphors embedded in a transparent windscreen display (TWD) light sources providing specific excitation wavelengths are needed. The use of lasers in vehicles may be limited due to regulatory or other policy concerns. Accordingly, the present disclosure provides a new and improved graphics projector suitable for use with HUD systems which does not utilize high power laser light sources.

Figure 1:
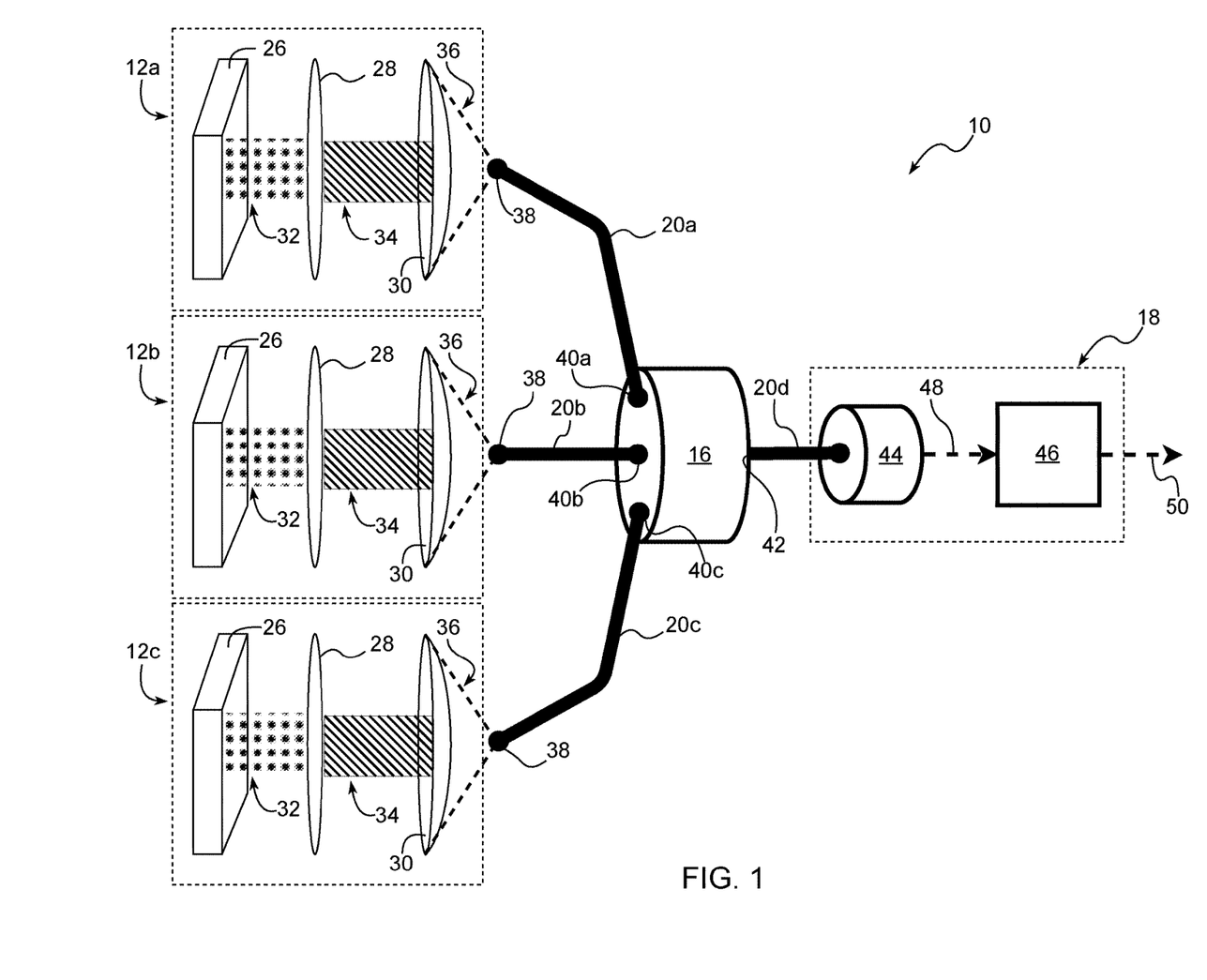
FIG. 1 is a schematic diagram of a first embodiment of a graphics projector for use in a vehicle according to an exemplary embodiment.

Referring to FIG. 1, a schematic diagram of a first embodiment of a graphics projector for use in a vehicle is illustrated and generally indicated by reference number 10. The first embodiment of the graphics projector 10 generally includes a first light source module 12a, a second light source module 12b, a third light source module 12c, a fiber-optic coupler 16, an output module 18.

The components of the first embodiment of the graphics projector 10 (i.e., the first light source module 12a, the second light source module 12b, the third light source module 12c, the fiber-optic coupler 16, and the output module 18) are in optical communication with each other. In the scope of the present disclosure, optical communication means that light can propagate through the space between the components and interact with the optical properties of each component. Optical communication may be facilitated by positioning the first light source module 12a, the second light source module 12b, the third light source module 12c, the fiber-optic coupler 16, and the output module 18 such that light is transmitted between the components due to the intrinsic reflection and/or refraction characteristics of the components and/or characteristics of a medium between the components (e.g., air). Optical communication may also be facilitated by use of an optical waveguide. In the scope of the present disclosure, an optical waveguide is a physical structure that is designed to confine and guide light along a specified path (i.e., between components in the first embodiment of the graphics projector 10). In a non-limiting example, a plurality of fiber-optic cables 20a, 20b, 20c, 20d are used to establish optical communication. In an exemplary embodiment, the fiber-optic cables 20a, 20b, 20c, 20d are optoelectrical cables which transmit light, acting as optical waveguides. In a non-limiting example, the fiber-optic cables 20a, 20b, 20c, 20d contain multiple strands of glass or plastic fibers. The fibers are bundled together and surrounded by a protective coating. The first fiber-optic cable 20a is used to establish optical communication between the first light source module 12a and the fiber-optic coupler 16. The second fiber-optic cable 20b is used to establish optical communication between the second light source module 12b and the fiber-optic coupler 16. The third fiber-optic cable 20c is used to establish optical communication between the third light source module 12c and the fiber-optic coupler 16. The fourth fiber-optic cable 20d is used to establish optical communication between the fiber-optic coupler 16 and the output module 18. It should further be understood that various additional methods for establishing optical communication between optical components, including, for example, planar waveguides, rib waveguides, channel waveguides, hollow core waveguides, and the like are within the scope of the present disclosure.

The first light source module 12a is used to produce light for the first embodiment of the graphics projector 10 as will be discussed in greater detail below. The first light source module 12*a* includes a light-emitting diode (LED) array 26, an optical filter 28, and a focusing lens 30.

The LED array 26 is used to provide a light source for the first light source module 12*a*. In an exemplary embodiment, the LED array 26 includes a plurality of light-emitting diodes (LEDs) electrically connected in a series or parallel configuration (not shown). The LED array 26 further includes at least two electrical terminals (not shown) electrically connected to the plurality of LEDs. The plurality of LEDs are arranged such as to achieve a high density of LEDs in a relatively small area. In a non-limiting example, the plurality of LEDs are arranged in a grid pattern. In another non-limiting example, the plurality of LEDs are arranged in a radial pattern. The plurality of LEDs are mechanically affixed to a substrate to provide structural stability to the arrangement of the plurality of LEDs. In a non-limiting example, the substrate is a printed circuit board (PCB). In another non-limiting example, the substrate is a metal-core printed circuit board (MCPCB) including a metal layer which contributes to thermal management of the plurality of LEDs by dissipating heat.

When an electrical current is passed through the plurality of LEDs using the electrical terminals, the plurality of LEDs emit light. The light emitted by the plurality of LEDs of the LED array 26 is referred to as a source light 32. In an exemplary embodiment, the source light 32 is polychromatic, meaning that the source light 32 contains multiple wavelengths of light (e.g., light having wavelengths between 380 nanometers and 460 nanometers). In another exemplary embodiment, the source light 32 is monochromatic, meaning that the source light 32 contains only a single wavelength of light (e.g., 380 nanometers, 405 nanometers, or 460 nanometers). It should be understood that the aforementioned wavelengths and wavelength ranges are merely exemplary in nature. The LED array 26 is configured such that the source light 32 is incident upon the optical filter 28.

The optical filter 28 is used to filter the source light 32. In an exemplary embodiment, the optical filter 28 is configured to receive the source light 32 and transmit a filtered light 34. In the scope of the present disclosure, the filtered light 34 is light having only wavelengths within a passband of the optical filter 28. In a non-limiting example, the optical filter 28 includes a substrate material (e.g., glass or quartz), onto which one or more layers of thin film are deposited. The thin film layers are designed to either absorb or refract specific wavelengths of light. In a first exemplary embodiment, the optical filter 28 is an interference optical bandpass filter. In a non-limiting example, the interference optical bandpass filter includes alternating dielectric layers of materials with different refractive indices. The alternating layers are configured to create an interference pattern that enhances the transmission of wavelengths within the passband and suppresses other wavelengths (analogous to a Fabry-Pérot interferometer).

In a second exemplary embodiment, the optical filter 28 is an absorptive optical bandpass filter. In a non-limiting example, the absorptive optical bandpass filter includes one or more layers of an absorbing dielectric material deposited on the substrate. The absorbing layers dissipate the unwanted wavelengths through absorption, while the wavelengths within the passband are transmitted. In exemplary embodiment, the passband of the optical filter 28 includes only monochromatic light having a single wavelength (e.g., 380 nanometers, 405 nanometers, 460 nanometers). Therefore, the filtered light 34 contains only light having a single wavelength. It should be understood that the aforementioned wavelengths are merely exemplary in nature, and that the passband of the optical filter 28 may include other wavelengths without departing from the scope of the present disclosure. The optical filter 28 is configured such that the filtered light 34 is incident upon the focusing lens 30.

The focusing lens 30 is used to concentrate the filtered light 34 to produce a narrow-beam light 36. In an exemplary embodiment, the focusing lens 30 includes a curved transparent substrate (e.g., glass or other transparent material). When the filtered light 34 passes through the focusing lens 30, the curvature of the focusing lens 30 causes the filtered light 34 to refract towards a focal point 38. The position of the focal point 38 is determined by the curvature and refractive index of the focusing lens 30. The focal point 38 of the focusing lens 30 is a termination of the first fiber-optic cable 20*a*, such that the narrow-beam light 36 is transmitted from the focusing lens 30 to the fiber-optic coupler 16 via the first fiber-optic cable 20*a*.

It should be understood that the second light source module 12*b* and the third light source module 12*c* each include the same components as the first light source module 12*a* (i.e., the LED array 26, the optical filter 28, and the focusing lens 30). Therefore, the description provided above for the first light source module 12*a* also applies to the second light source module 12*b* and the third light source module 12*c*. In an exemplary embodiment, each of the first light source module 12*a*, the second light source module 12*b*, and the third light source module 12*c* is configured to produce narrow-beam light 36 having a different wavelength. In a non-limiting example, the first light source module 12*a* produces narrow-beam light 36 having a wavelength of 380 nanometers. The second light source module 12*b* produces narrow-beam light 36 having a wavelength of 405 nanometers. The third light source module 12*c* produces narrow-beam light 36 having a wavelength of 460 nanometers. It should be understood that the first light source module 12*a*, the second light source module 12*b*, and the third light source module 12*c* may be configured to produce narrow-beam light 36 having different wavelengths without departing from the scope of the present disclosure. It should also be understood that the first embodiment of the graphics projector 10 may include more or less than three light source modules without departing from the scope of the present disclosure.

The fiber-optic coupler 16 is used to combine the narrow-beam light 36 from each of the first light source module 12*a*, the second light source module 12*b*, and the third light source module 12*c*. In an exemplary embodiment, the fiber-optic coupler 16 includes a first input port 40*a* in optical communication with the first light source module 12*a* via the first fiber-optic cable 20*a*, a second input port 40*b* in optical communication with the second light source module 12*b* via the second fiber-optic cable 20*b*, and a third input port 40*c* in optical communication with the third light source module 12*c* via the third fiber-optic cable 20*c*. The fiber-optic coupler 16 further includes an output port 42. Each of the input ports 40*a*, 40*b*, 40*c* and output port 42 includes an optical fiber (not shown) which is aligned and fused with the optical fibers of the other ports. When light is introduced into one of the input ports 40*a*, 40*b*, 40*c*, the light propagates along the optical fiber and is transferred to the output port 42. Therefore, the intensity of the narrow-beam light 36 from each of the first light source module 12*a*, the second light source module 12*b*, and the third light source module 12*c* is summed at the output port 42 of the fiber-optic coupler 16. The output port 42 is in optical communication with the output module 18 via the fourth fiber-optic cable 20*d*.

The output module 18 is used to direct the narrow-beam light 36 from the output port of the fiber-optic coupler 16 in order to project graphics. The output module 18 includes an optical collimator 44 and an optoelectrical mirror 46.

The optical collimator 44 is used to produce a collimated light 48 from the narrow-beam light 36. In an exemplary embodiment, the optical collimator 44 includes a collimating lens, which is used to focus the narrow-beam light 36 into a parallel (i.e., collimated) beam. In a non-limiting example, the collimating lens is a piano-convex or double-convex lens which is configured to produce a desired beam divergence and collimation distance. The optical collimator 44 works by refracting the narrow-beam light 36 from the fiber-optic coupler 16 using the collimating lens to produce the collimated light 48. The optical collimator 44 is in optical communication with the optoelectrical mirror 46.

The apparatus including the first light source module 12a, the second light source module 12b, the third light source module 12c, and the optical collimator 44 is also referred to as a projector light source, and may be used as a source of collimated light for various types and configurations of projector systems without departing from the scope of the present disclosure.

The optoelectrical mirror 46 is used to direct the collimated light 48 based on electrical signals. In the scope of the present disclosure, the optoelectrical mirror 46 is an electromechanical device (e.g., a microelectromechanical system) configured to direct light with high precision, accuracy, and speed in response to electrical signals. In an exemplary embodiment, the optoelectrical mirror 46 includes a digital micromirror device (DMD). The DMD is an optical microelectromechanical system that contains an array of mirrors which can be individually tilted to reflect light in a desired direction. In a non-limiting example, the DMD is used to create high-resolution images by reflecting the collimated light 48 onto a projection surface. The tilting mirrors on the DMD are controlled by an electronic driver, which rapidly modulates the mirrors to project a graphic onto a projection surface.

In another exemplary embodiment, the optoelectrical mirror 46 is a microelectromechanical scanning mirror. In an exemplary embodiment, the microelectromechanical scanning mirror is an optoelectrical device which utilizes at least one mirror to create high-resolution images. The at least one mirror may be tilted to reflect the collimated light 48 in a desired direction. The tilting action of the at least one mirror is controlled by an electronic driver, which rapidly modulates the mirrors to project a graphic onto the projection surface.

In yet another exemplary embodiment, the optoelectrical mirror 46 is a galvanometer mirror. In an exemplary embodiment, the galvanometer mirror is an optoelectrical device which utilizes at least one mirror which rotates on an axis to redirect the collimated light 48. The at least one mirror of the galvanometer mirror is controlled by a galvanometer, which is an electric motor which converts electrical current signals into mechanical movement. The galvanometer rapidly rotates the at least one mirror on the axis, allowing the collimated light 48 to be redirected to scan the collimated light 48 across a projection surface and display a graphic. The light transmitted by the optoelectrical mirror 46 to the projection surface is referred to as a projected light 50.

It should be understood that in order to adjust a total light intensity of the projected light 50, the first embodiment of the graphics projector 10 may include more or less than three light source modules without departing from the scope of the present disclosure.

Figure 2:
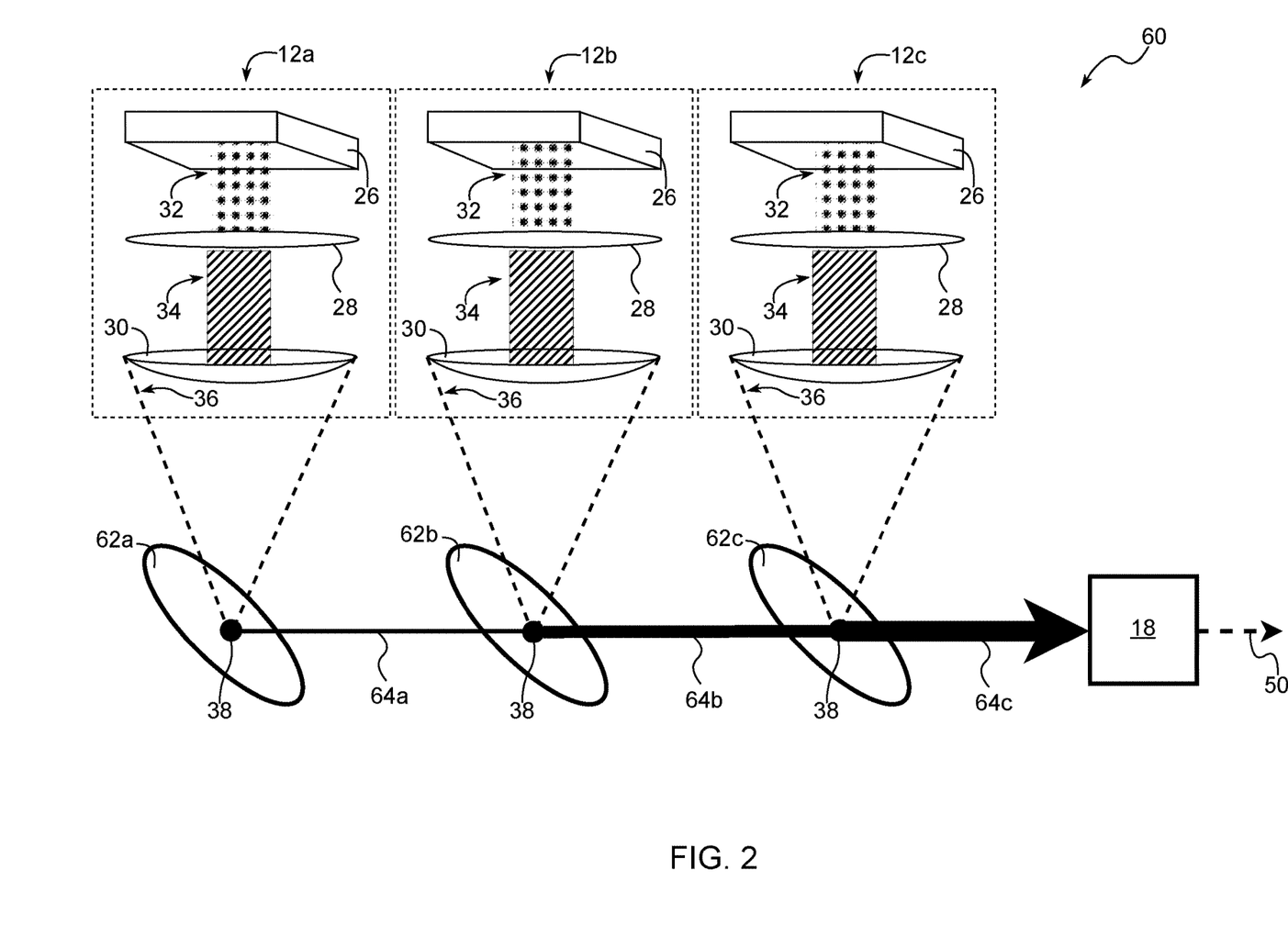
FIG. 2 is a schematic diagram of a second embodiment of a graphics projector for use in a vehicle according to an exemplary embodiment.

Referring to FIG. 2, a schematic diagram of a second embodiment of a graphics projector for use in a vehicle is illustrated and generally indicated by reference number 60. The second embodiment of the graphics projector 60 generally includes the first light source module 12a, the second light source module 12b, the third light source module 12c, a first dichroic mirror 62a, a second dichroic mirror 62b, a third dichroic mirror 62c, and the output module 18. The description of the first light source module 12a, the second light source module 12b, the third light source module 12c, and the output module 18 given above in reference to FIG. 1 and the first embodiment of the graphics projector 10 also applies to the corresponding elements in the second embodiment of the graphics projector 60. Instead of the fiber-optic cables 20a, 20b, 20c, 20d and the fiber-optic coupler 16, the second embodiment of the graphics projector 60 utilizes the first dichroic mirror 62a, the second dichroic mirror 62b, and the third dichroic mirror 62c to combine the narrow-beam light 36 from each of the first light source module 12a, the second light source module 12b, and the third light source module 12c.

In the scope of the present disclosure, a dichroic mirror is a mirror which reflects light of a predetermined wavelength and transmits light of other wavelengths. In an exemplary embodiment, the first dichroic mirror 62a, the second dichroic mirror 62b, and the third dichroic mirror 62c include a substrate material (e.g., glass, quartz) coated in a plurality of dielectric layers. Each of the plurality of dielectric layers is selected to have a particular index of refraction and thickness such that the first dichroic mirror 62a, the second dichroic mirror 62b, and the third dichroic mirror 62c reflect light of particular wavelengths and transmit light of other wavelengths.

In a non-limiting example, the first light source module 12a produces narrow-beam light 36 having a wavelength of 380 nanometers. The second light source module 12b produces narrow-beam light 36 having a wavelength of 405 nanometers. The third light source module 12c produces narrow-beam light 36 having a wavelength of 460 nanometers. Accordingly, the first dichroic mirror 62a is configured to reflect narrow-beam light 36 having a wavelength of 380 nanometers and transmit all other wavelengths of light. The second dichroic mirror 62b is configured to reflect narrow-beam light 36 having a wavelength of 405 nanometers and transmit all other wavelengths of light. The third dichroic mirror 62c is configured to reflect narrow-beam light 36 having a wavelength of 460 nanometers and transmit all other wavelengths of light. It should be understood that the aforementioned wavelengths are merely exemplary in nature.

The first dichroic mirror 62a is positioned such that narrow-beam light 36 from the first light source module 12a reflected by the first dichroic mirror 62a is incident upon the second dichroic mirror 62b. The second dichroic mirror 62b is positioned such that narrow-beam light 36 from the second light source module 12b reflected by the second dichroic mirror 62b is incident upon the third dichroic mirror 62c. The third dichroic mirror 62c is positioned such that narrow-beam light 36 from the third light source module 12c reflected by the third dichroic mirror 62c is incident upon the output module 18. In an exemplary embodiment, each of the first dichroic mirror 62a, the second dichroic mirror 62b, and the third dichroic mirror 62c are positioned at a 45-degree angle to an angle of incidence of the narrow-beam light 36 and aligned along a center axis, as depicted in FIG. 2.

Therefore, the narrow-beam light 36 with a wavelength of 380 nanometers from the first light source module 12a is reflected by the first dichroic mirror 26a and incident upon the second dichroic mirror 62b, as indicated by a first line 64a. The narrow-beam light 36 with a wavelength of 380 nanometers from the first light source module 12a is transmitted by the second dichroic mirror 62b and is incident upon the third dichroic mirror 62c. The narrow-beam light 36 with a wavelength of 405 nanometers from the second light source module 12b is reflected by the second dichroic mirror 62b and is incident upon the third dichroic mirror 62c. Therefore, both the narrow-beam light 36 with a wavelength of 380 nanometers from the first light source module 12a and the narrow-beam light 36 with a wavelength of 405 nanometers from the second light source module 12b are incident upon the third dichroic mirror 62c as indicated by a second line 64b. The narrow-beam light 36 with a wavelength of 380 nanometers from the first light source module 12a and the narrow-beam light 36 with a wavelength of 405 nanometers from the second light source module 12b are transmitted by the third dichroic mirror 62c and are incident upon the output module 18. The narrow-beam light 36 with a wavelength of 460 nanometers from the third light source module 12c is reflected by the third dichroic mirror 62c and is incident upon the output module 18. Therefore, the narrow-beam light 36 with a wavelength of 380 nanometers from the first light source module 12a, the narrow-beam light 36 with a wavelength of 405 nanometers from the second light source module 12b, and the narrow-beam light 36 with a wavelength of 460 nanometers from the third light source module 12c are incident upon the output module 18 as indicated by a third line 64c.

The total narrow-beam light (i.e., the narrow-beam light 36 with a wavelength of 380 nanometers from the first light source module 12a, the narrow-beam light 36 with a wavelength of 405 nanometers from the second light source module 12b, and the narrow-beam light 36 with a wavelength of 460 nanometers from the third light source module 12c) incident upon the output module 18 is collimated by the optical collimator 44 and directed by the optoelectrical mirror 46 as discussed above.

Figure 3:
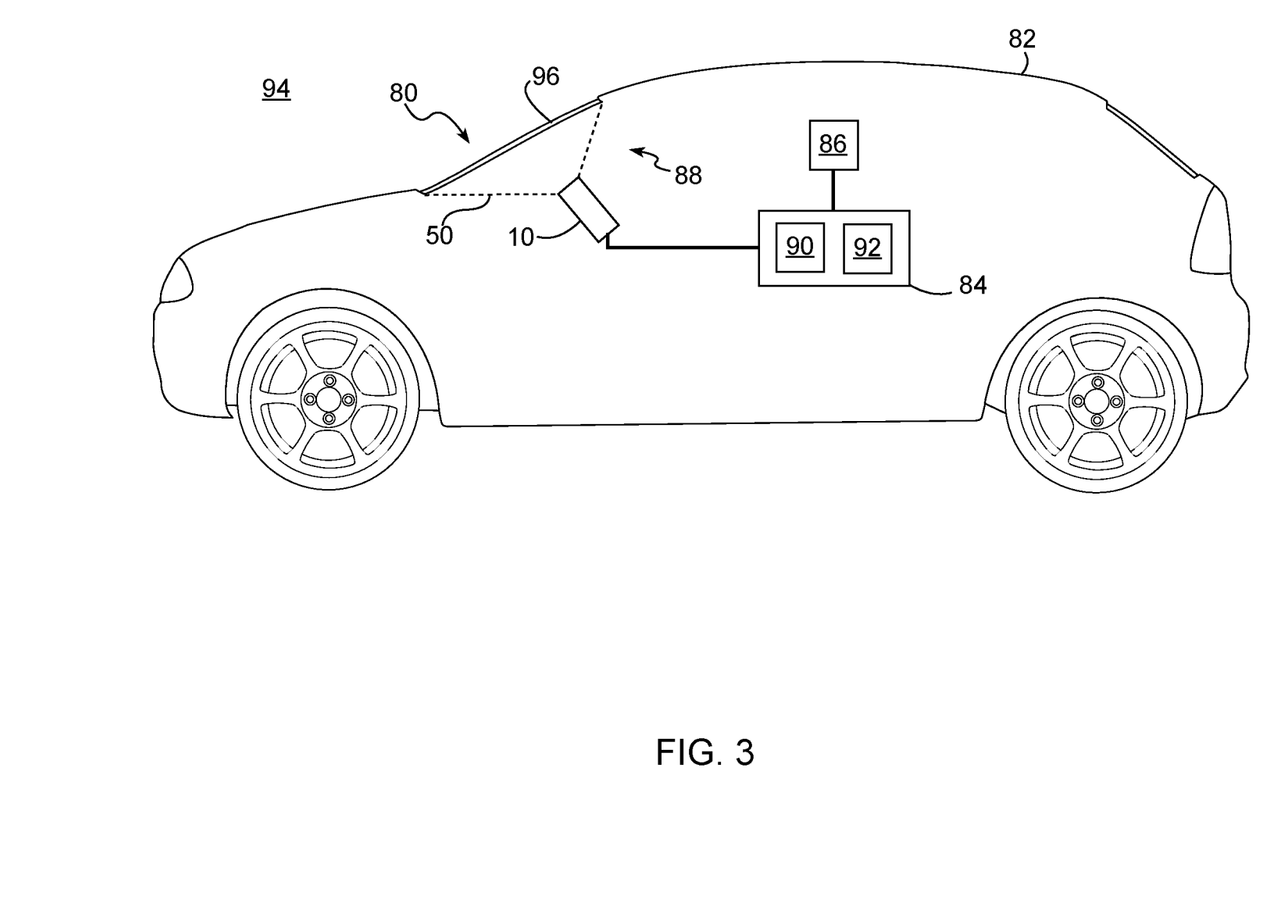
FIG. 3 is a schematic diagram of a system for projecting graphics for a vehicle according to an exemplary embodiment.

Referring to FIG. 3, a schematic diagram of a system for projecting graphics for a vehicle is shown and generally indicated by reference number 80. The system 80 is shown with an exemplary vehicle 82. While a passenger vehicle is illustrated, it should be appreciated that the vehicle 82 may be any type of vehicle without departing from the scope of the present disclosure. The system 80 generally includes a controller 84, a plurality of vehicle sensors 86, and a transparent windscreen display (TWD) system 88.

The controller 84 is used to control the TWD system 88. The controller 84 includes at least one processor 90 and a non-transitory computer readable storage device or media 92. The processor 90 may be a custom made or commercially available processor, a central processing unit (CPU), a graphics processing unit (GPU), an auxiliary processor among several processors associated with the controller 84, a semiconductor-based microprocessor (in the form of a microchip or chip set), a macroprocessor, a combination thereof, or generally a device for executing instructions. The computer readable storage device or media 92 may include volatile and nonvolatile storage in read-only memory (ROM), random-access memory (RAM), and keep-alive memory (KAM), for example. KAM is a persistent or nonvolatile memory that may be used to store various operating variables while the processor 90 is powered down. The computer-readable storage device or media 92 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 84 to control various systems of the vehicle 82. The controller 84 may also consist of multiple controllers which are in electrical communication with each other. The controller 84 may be inter-connected with additional systems and/or controllers of the vehicle 82, allowing the controller 84 to access data such as, for example, speed, acceleration, braking, and steering angle of the vehicle 82.

The controller 84 is in electrical communication with the plurality of vehicle sensors 86 and the TWD system 88. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 84 are within the scope of the present disclosure.

The plurality of vehicle sensors 86 is used to determine information about an environment 94 surrounding the vehicle 82. In an exemplary embodiment, the plurality of vehicle sensors 86 includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors further includes sensors to determine information about the environment 94 surrounding the vehicle 82, for example, an ambient air temperature sensor, a barometric pressure sensor, and/or a photo and/or video camera which is positioned to view the environment 94 in front of the vehicle 82. In another exemplary embodiment, at least one of the plurality of vehicle sensors 86 is capable of measuring distances in the environment 94 surrounding the vehicle 82. In a non-limiting example wherein the plurality of vehicle sensors 86 includes a camera, the plurality of vehicle sensors 86 measures distances using an image processing algorithm configured to process images from the camera and determine distances between objects. In another non-limiting example, the plurality of vehicle sensors 86 includes a stereoscopic camera having distance measurement capabilities. In one example, at least one of the plurality of vehicle sensors 86 is affixed inside of the vehicle 82, for example, in a headliner of the vehicle 82, having a view through a windscreen 96 of the vehicle 82. In another example, at least one of the plurality of vehicle sensors 86 is affixed outside of the vehicle 82, for example, on a roof of the vehicle 82, having a view of the environment 94 surrounding the vehicle 82. It should be understood that various additional types of vehicle sensors, such as, for example, LiDAR sensors, ultrasonic ranging sensors, radar sensors, and/or time-of-flight sensors are within the scope of the present disclosure.

The TWD system 88 is a type of head-up display (HUD) system used to display graphics on the windscreen 96 of the vehicle 82. The TWD system 88 can display TWD graphics (not shown) in any region of the windscreen 96. In an exemplary embodiment, the TWD system 88 includes transparent phosphors (not shown) embedded into the windscreen 96 and the first embodiment of the graphics projector 10. In another exemplary embodiment, the TWD system 88 includes the second embodiment of the graphics projector 60 instead of the first embodiment of the graphics projector 10.

The TWD system 88 is in electrical communication with the controller 14 as discussed above.

The transparent phosphors are light emitting particles which fluoresce in response to being excited by the first embodiment of the graphics projector 10 or the second embodiment of the graphics projector 60. In an exemplary embodiment, the transparent phosphors are red, green, and blue (RGB) phosphors, allowing full color operation of the TWD system 88. The use of monochrome and/or two-color phosphors is also within the scope of the present disclosure. When excitation light is absorbed by the transparent phosphors, visible light is emitted by the transparent phosphors. The excitation light is provided by the first embodiment of the graphics projector 10 or the second embodiment of the graphics projector 60.

The first embodiment of the graphics projector 10 or the second embodiment of the graphics projector 60 is used to excite the transparent phosphors in a predetermined pattern to produce the TWD graphics on the windscreen 96. In an exemplary embodiment, the first embodiment of the graphics projector 10 or the second embodiment of the graphics projector 60 is disposed proximally to the headliner of the vehicle 82. In a non-limiting example, the 380 nanometer light of the projected light 50 excites red transparent phosphors. The 405 nanometer light of the projected light 50 excites blue transparent phosphors. The 460 nanometer light of the projected light 50 excites green transparent phosphors. It should be understood that in some embodiments, the transparent phosphors may be excited by other wavelengths of excitation light. The first embodiment of the graphics projector 10 or the second embodiment of the graphics projector 60 may be configured to produce any wavelengths of excitation light required to excite the transparent phosphors.

In an exemplary embodiment, the controller 84 uses the TWD system 88 to display graphics indicating conditions of the vehicle 82 and/or the environment 94 surrounding the vehicle 82 detected by the plurality of vehicle sensors 86. In a non-limiting example, the TWD system 88 is used as a primary instrument to display information such as, for example, vehicle speed, coolant temperature, fuel level, state of charge, and/or the like. In another non-limiting example, the controller 84 uses the TWD system 88 to highlight an object of interest in the environment 94 surrounding the vehicle 82, for example, a hazardous object in a path of the vehicle 82. Using the plurality of vehicle sensors 86, the controller 84 identifies an object of interest and determines a position of the object of interest relative to the vehicle 82. Subsequently, the controller 84 uses the TWD system 88 to display a graphic which appears, from a perspective of a vehicle occupant, to be overlayed on the object of interest based at least on the position of the object of interest relative to the vehicle 82. Use of the TWD system 88 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

It should be understood that the system 80 is merely exemplary in nature, and that the first embodiment of the graphics projector 10 and/or the second embodiment of the graphics projector 60 may be used in other devices (e.g., a video projector), in other vehicles (e.g., seafaring vehicles, airborne vehicles, and the like), and/or in other systems without departing from the scope of the present disclosure.

The first embodiment of the graphics projector 10 and the second embodiment of the graphics projector 60 of the present disclosure offer several advantages. By providing a plurality of light source modules, each of the plurality of light source modules may be individually configured to achieve a desired output characteristics (e.g., intensity, wavelength, and the like). Furthermore, each of the plurality of light source modules may be adjusted by the controller to adjust an intensity and wavelength composition of the projected light during projection, enabling precise control of the excitation of the transparent phosphors. Furthermore, excitation of the transparent phosphors is achieved using diffuse light sources (i.e., the LED array), reducing cost and complexity and avoiding possible disadvantages of high-powered, concentrated light sources.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A graphics projector for use in a vehicle, the graphics projector comprising:
   a light source module comprising:
      a light-emitting diode (LED) array configured to produce a source light;
      an optical filter in optical communication with the LED array, wherein the optical filter is configured to receive the source light and transmit a filtered light;
      a focusing lens in optical communication with the optical filter, wherein the focusing lens is configured to receive the filtered light and transmit a narrow-beam light;
   an optical collimator in optical communication with the light source module, wherein the optical collimator is configured to receive the narrow-beam light and transmit a collimated light; and
   an optoelectrical mirror in optical communication with the optical collimator, wherein the optoelectrical mirror is configured to direct the collimated light to form a graphic.

2. The light source module of claim 1, wherein the optical filter is an optical bandpass filter configured to filter the source light and transmit the filtered light, wherein the filtered light includes only light having a wavelength within a passband of the optical bandpass filter.

3. The graphics projector of claim 1, further comprising a plurality of light source modules in optical communication with the optical collimator.

4. The graphics projector of claim 3, further comprising an optical waveguide in optical communication with the plurality of light source modules and the optical collimator, wherein the optical waveguide is configured to transmit the narrow-beam light from each of the plurality of light source modules to the optical collimator.

5. The graphics projector of claim 4, wherein the optical waveguide is a fiber-optic cable in optical communication with the focusing lens of each of the plurality of light source modules using a fiber-optic coupler.

6. The graphics projector of claim 3, further including a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

7. The graphics projector of claim 6, wherein each of the plurality of dichroic mirrors is configured to reflect a predetermined wavelength of the narrow-beam light and transmit all other wavelengths of the narrow-beam light.

8. The graphics projector of claim 3, wherein one of the plurality of light source modules is configured to produce narrow-beam light having a wavelength of 380 nanometers, wherein one of the plurality of light source modules is configured to produce narrow-beam light having a wavelength of 405 nanometers, and wherein one of the plurality of light source modules is configured to produce narrow-beam light having a wavelength of 460 nanometers.

9. The graphics projector of claim 1, wherein the optoelectrical mirror is a digital micromirror device (DMD).

10. The graphics projector of claim 1, wherein the optoelectrical mirror is at least one of: a microelectromechanical scanning mirror and a galvanometer mirror.

11. A projector light source comprising:
a light source module comprising:
    a light-emitting diode (LED) array configured to produce a source light;
    an optical filter in optical communication with the LED array, wherein the optical filter is configured to receive the source light and transmit a filtered light;
    a focusing lens in optical communication with the optical filter, wherein the focusing lens is configured to receive the filtered light and transmit a narrow-beam light; and
an optical collimator in optical communication with the light source module, wherein the optical collimator is configured to receive the narrow-beam light and transmit a collimated light.

12. The light source module of claim 11, wherein the optical filter is an optical bandpass filter configured to filter the source light and transmit the filtered light, wherein the filtered light includes only light having a wavelength within a passband of the optical bandpass filter.

13. The projector light source of claim 11, further comprising a plurality of light source modules in optical communication with the optical collimator.

14. The projector light source of claim 13, further comprising an optical waveguide in optical communication with the plurality of light source modules and the optical collimator, wherein the optical waveguide is configured to transmit the narrow-beam light from each of the plurality of light source modules to the optical collimator.

15. The projector light source of claim 14, wherein the optical waveguide is a fiber-optic cable in optical communication with the focusing lens of each of the plurality of light source modules using a fiber-optic coupler.

16. The projector light source of claim 13, further including a plurality of dichroic mirrors, wherein each of the plurality of dichroic mirrors is in optical communication with one of the plurality of light source modules, and wherein each of the plurality of dichroic mirrors is configured to transmit the narrow-beam light from one of the plurality of light source modules to the optical collimator.

17. The projector light source of claim 13, wherein one of the plurality of light source modules is configured to produce narrow-beam light having a wavelength of 380 nanometers, wherein one of the plurality of light source modules is configured to produce narrow-beam light having a wavelength of 405 nanometers, and wherein one of the plurality of light source modules is configured to produce narrow-beam light having a wavelength of 460 nanometers.

18. A graphics projection system for a vehicle, the graphics projection system comprising:
a graphics projector comprising:
    a plurality of light source modules, each of the plurality of light source modules comprising:
        a light-emitting diode (LED) array configured to produce a source light;
        an optical filter in optical communication with the LED array, wherein the optical filter is configured to receive the source light and transmit a filtered light; and
        a focusing lens in optical communication with the optical filter, wherein the focusing lens is configured to receive the filtered light and transmit a narrow-beam light;
    a fiber-optic coupler having a plurality of input ports and an output port, wherein each of the plurality of input ports of the fiber-optic coupler is in optical communication with one of the plurality of light source modules;
    an optical collimator in optical communication with the output port of the fiber-optic coupler, wherein the optical collimator is configured to receive the narrow-beam light from the plurality of light source modules and transmit a collimated light; and
    an optoelectrical mirror in optical communication with the optical collimator, wherein the optoelectrical mirror is configured to direct the collimated light to form a graphic;
transparent phosphors embedded into a windscreen of the vehicle; and
a controller in electrical communication with the graphics projector, wherein the controller is programmed to:
    control the graphics projector to selectively excite the transparent phosphors to display graphics on the windscreen.

19. The graphics projector of claim 18, wherein one of the plurality of light source modules is configured to produce narrow-beam light having a wavelength of 380 nanometers, wherein one of the plurality of light source modules is configured to produce narrow-beam light having a wavelength of 405 nanometers, and wherein one of the plurality of light source modules is configured to produce narrow-beam light having a wavelength of 460 nanometers.

20. The graphics projector of claim 19, wherein the optoelectrical mirror is at least one of: a digital micromirror device (DMD), a microelectromechanical scanning mirror, and a galvanometer mirror.

* * * * *